(12) United States Patent
Mansur

(10) Patent No.: US 6,226,330 B1
(45) Date of Patent: May 1, 2001

(54) EIGEN-MODE ENCODING OF SIGNALS IN A DATA GROUP

(75) Inventor: Daniel C. Mansur, Chippewa Falls, WI (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/118,158

(22) Filed: Jul. 16, 1998

(51) Int. Cl.[7] .................................................. H04B 3/50
(52) U.S. Cl. ............................... 375/257; 375/288
(58) Field of Search .................... 375/257, 288, 375/295; 340/870.31, 870.37, 310.01, 310.02, 310.07

(56) References Cited

U.S. PATENT DOCUMENTS

| | | | |
|---|---|---|---|
| 4,587,445 | 5/1986 | Kanuma | 307/443 |
| 5,295,132 | 3/1994 | Hashimoto et al. | 370/13 |
| 5,315,175 | 5/1994 | Langner | 307/443 |
| 5,416,606 | 5/1995 | Katayama et al. | 358/467 |
| 5,481,567 | 1/1996 | Betts et al. | 375/261 |
| 5,604,450 | 2/1997 | Borkar et al. | 326/82 |
| 5,657,346 | 8/1997 | Lordi et al. | 375/224 |
| 5,793,259 | 8/1998 | Chengson | 331/78 |
| 5,811,997 | 9/1998 | Chengson et al. | 327/112 |
| 5,847,592 | 12/1998 | Gleim et al. | 327/403 |
| 5,898,729 | 4/1999 | Boezen et al. | 375/259 |
| 6,005,895 | * 12/1999 | Perino et al. | 375/288 |

OTHER PUBLICATIONS

Im, G., et al., "Bandwidth–Efficient Digital Transmission over Unshielded Twisted–Pair Wiring", *IEEE Journal on Selected Areas in Communications*, 13(9), pp. 1643–1655, (Dec. 1995).

Mooney, R., et al., "A 900 Mb/s Bidirectional Signaling Scheme", *IEEE Journal of Solid–State Circuits*, 30(12), 1538–1543, (Dec. 1995).

Takahashi, T., et al., "110GB/s Simultaneous Bi–Directional Transceiver Logic Synchronized with a System Clock", *IEEE International Solid–State Circuits Conference*, pp. 176–177, (1999).

"Low Power Quad Differential Line Driver with Cut–Off", *F100K ECL 300 Series Databook and Design Guide*, National Semiconductor, 2–54:2–60, (1992).

Djordjevic, et al., "Time Domain Response of Multiconductor Transmission Lines", *Proceedings of the IEEE*, (Jun. 1987).

* cited by examiner

Primary Examiner—Amanda T. Le
(74) Attorney, Agent, or Firm—Schwegman, Lundberg, Woessner & Kluth, P.A.

(57) ABSTRACT

A system and method for encoding N signals onto an N+1 conductor signal line. First, the electrical characteristics of the signal line are determined by calculating an inductance matrix for each conductor, calculating electrostatic inductance for each conductor and calculating an eigen-mode encoding matrix. The N signals are then encoded into signals enc(0) through enc(n), wherein the step of encoding comprises the step of encoding each of the N signals as a function of the eigen-mode encoding matrix.

13 Claims, 14 Drawing Sheets

EIGEN-MODE ENCODING OF SIGNALS IN A DATA GROUP

BACKGROUND OF THE INVENTION

1. Field of the Invention

The present invention relates in general to methods and apparatus for electronic data transmission, and in particular to a system and method for efficiently and accurately transmitting information on a data bus in the presence of noise.

2. Background Information

A data bus commonly consists of lines for transferring data words between devices within a computer. A data word is made up of data bits transmitted as varying voltages on the data bus lines. Noise, interference, or other events such as ground voltage shifts between transmitter and receiver alter the signal such that what is sent may not be what is received. The possibility of signal alteration, whether or not it actually occurs, creates a need for ways to improve signal integrity. Both hardware and software solutions have been considered in the development of accurate data transmission methods.

One method of improving signal integrity is to run a separate ground line between the transmitter and receiver. The ground line voltage is used as a reference voltage. The difference between the data signal received at the receiver and the ground line voltage at the receiver is used to determine the signal polarity. One problem with this method is that it is not precise—the margin of error inherent in measuring voltage levels at the receiver may either mask or exaggerate voltage level variations due to noise. In addition, since the interfering source may effect the ground reference line differently than the signal lines, there is an increase in the probability of transmission errors. Many applications have a need, however, for highly accurate message transfer.

Another message verification method is to run a differential line for each data line. According to this method there are two lines for every channel between the transmitter and the receiver. The first line carries the signal and the second line carries the complement of that signal (for example, where the first line value is '1', the second line value is '0'). The message being transferred is represented by the difference between the two signals. Any ground voltage shifts occurring during transmission equally affect both lines, so there is no net effect on the message because the difference between the two lines remains constant. Also, because the ground return currents, created by the two lines, are equal in amplitude and opposite in polarity, the noise generated by simultaneously switched outputs (SSO noise) will be minimized. One of the primary benefits of this method is that it requires no local reference value. The weakness is that it doubles both the number of pins used on the ICs and the number of conductors used in the transmission lines.

U.S. patent application Ser. No. 08/971185, entitled "Spacial Derivative Bus Encoder and Decoder" filed Nov. 17, 1997 by Mansur and assigned to the present assignee, describes one method for providing efficient and accurate electronic data transmission of information on a data bus in the presence of noise. The method uses a spacial derivative encoder to encode data signals received on N input lines onto N+1 output lines. The data on the N input lines can be recovered at a receiver using a spacial derivative decoder to recover the signals from the N+1 output lines.

The approach taught by Mansur does reduce the number of lines needed to transfer signals, while still providing rejection of common mode noise and cancellation of net ground return current transients. It does not, however, compensate for coupling between adjacent conductors (crosstalk). Furthermore, it has a high sensitivity to sources of random noise. There is a need, therefore, for a system and method of encoding signals which not only reduces the number of signal lines required to transfer data from a plurality of wires but which also reduces signal degradation due to common mode noise, crosstalk, simultaneous switching, ground bounce due to power transients and electromagnetic interference (EMI).

SUMMARY OF THE INVENTION

The present invention is a system and method for encoding N signals onto an N+1 conductor transmission line. First, the electrical characteristics of the transmission line are determined by calculating an electromagnetic induction matrix (L) and an electrostatic induction matrix (B) for the transmission line. Matrices L and B are then used to calculate an eigen-mode encoding matrix. The N signals are then encoded into signals enc(0) through enc(n), wherein the step of encoding comprises the step of encoding each of the N signals as a function of the eigen-mode encoding matrix.

DETAILED DESCRIPTION OF THE PREFERRED EMBODIMENTS

In the following Detailed Description of the Preferred Embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
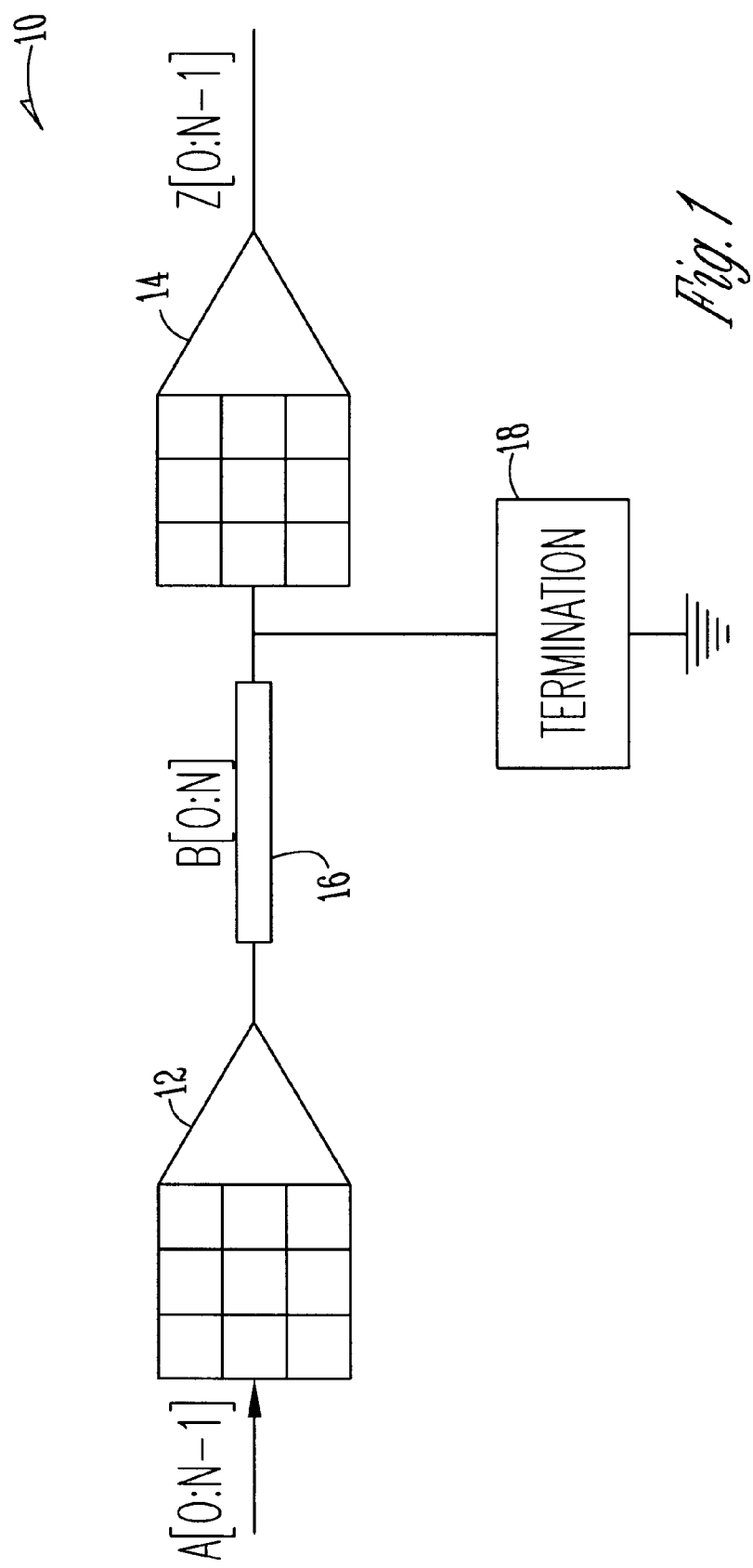
FIG. 1 is a block diagram of communications system in which a transmitter transfers encoded data to a receiver over a multi-conductor transmission line.

FIG. 1 is a block diagram of communications system 10 in which a transmitter 12 transfers encoded data to a receiver 14 over a multi-conductor transmission line 16. Transmitter 12 receives N lines of data and encodes the N lines of data into N+1 lines of eigen-mode-encoded data. The eigen-mode-encoded data is then transferred across transmission line 16 to receiver 14. Receiver 14 receives the eigen-mode-encoded data and decodes the data to recover the original N lines of data. System 10 may also include a termination network 18 used to terminate transmission line 16.

Eigen-mode encoding transforms the signals A[0:N−1] in FIG. 1 so that all of the signals in the data group are transmitted as orthogonal eigen-modes of a multiple conductor bus.

The signals are encoded in the following manner: First, the electrical characteristics of the N+1 conductor transmission line are determined by calculating the electromagnetic induction matrix (L) and the electrostatic induction matrix (B). (The B matrix is related to the capacitance matrix (C), but must not be confused with it.) From this information, a system of eigen vectors will be calculated, each vector representing an independent mode of propagation on the transmission line. Next, an encoding matrix is calculated from the eigen vectors, such that each signal is assigned to a different mode of propagation on the transmission line. Then a device is designed that implements the encoding matrix, by translating the signals on its input to patterns of voltages and currents that are applied to the conductors in a transmission line. A decoding matrix, and a device for implementing it, are also designed, based on the inverse of the encoding matrix. Last, the values for the resistors in a termination network are calculated, and impedance matched to the transmission line.

Such an approach provides all the advantages of differential transmission, while using only N+1 conductors instead of the 2*N conductors required for differential data transmission. (In fact, differential data transmission could be considered to be the lowest order form of eigen-mode encoding (i.e., where N=1).)

The theoretical basis of eigen-mode encoding can be understood using modal analysis of multi conductor transmission lines, such as described by Djordjevic et al., in "Time Domain Response of Multiconductor Transmission Lines," published June 1987 in *Proceedings of the IEEE*. Once a designer has determined the M by M inductance [L] and Capacitance [C] matrixes that describe the electrical characteristics of an M conductor transmission line, then a system of M orthogonal eigen-vectors can be determined that, when matrix multiplied by the original data vector [D], will perform a transform that maps each of the signals onto each of the orthogonal eigen-modes (except the common mode). The fact that the eigen-modes are orthogonal will result in the elimination of mixing of signals, regardless of the degree of coupling between the lines. The entry in the data vector that would otherwise be projected onto the common mode should be set to zero, or remained fixed with respect to time, in order that the sum of the currents on all the conductors in the transmission bus will remain invariant with time. This will eliminate transient currents in ground connections, thereby reducing SSO noise, and EMI emissions.

In order to illustrate the operation of an eigen-mode transmission channel, we will consider the design of a simple data channel that transmits 3 signals using a shielded bundle of four conductors. Such a data channel is shown in FIG. 3.

Figure 3:
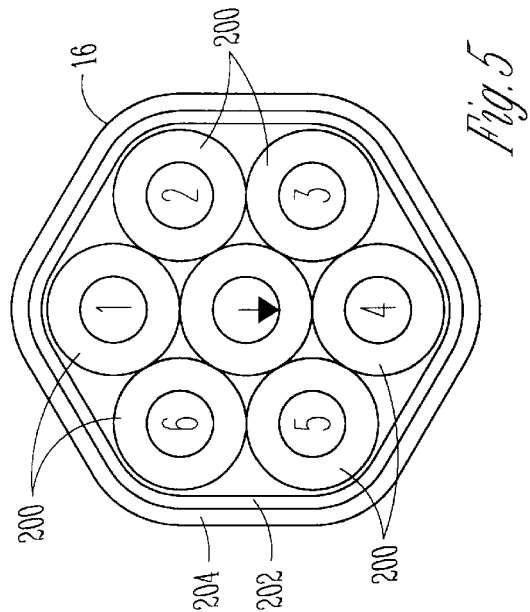
FIG. 3 is a drawing of the cross section of a multi-conductor transmission line, for which the number of wires is four, and the number of signals that can be transmitted, using eigen-mode encoding, is three.

First, let us assume that we want to send signals across a transmission line 16 such as the four wire shielded transmission line shown in FIG. 3. A representative four wire shielded transmission line includes four silver plated copper wires (N, S, W and E). Each wire is insulated using FEP insulation 200. An aluminum/polyester shield 202 surrounds the wires. A PVC jacket 204 covers shield 202. This type of cable is commercially available. In one embodiment, such as is shown in FIG. 3, the wires are labeled north (N), south (S), east (E), and west (W) for this analysis. The common practice is to transmit two signals on these four wires. One signal is sent through a differential driver which has its true output connected to the north wire, and its compliment output connected to the south wire. A second signal is driven differentially on the east and west wires in an identical manner. At the receiver, the data is recovered using ordinary differential comparators. There are some economic advantages to designing a system that has 2 signals encoded on four wires as described so far, but these gains are marginal because it still uses twice the number of conductors as there are signals. More advantages can be realized by encoding another signal onto another propagation mode of the cable. This third mode can be activated by driving currents onto the north and south wires in opposition to currents driven onto the east and west wires. The other signals will not be disturbed because this third mode is orthogonal to the other two. One way to extract the third signal from the voltages at the receiver is to measure the difference of the average of the voltages on the north and south wires, with the average of the voltages on the east and west wires. The eigen-mode encoding matrix for one such embodiment is shown in Table 1.

TABLE 1

3 SIGNAL TO LINE EIGEN-MODE ENCODING MATRIX

|  | MODE 1 COMMON | MODE 2 SIG. 1 | MODE 3 SIG. 2 | MODE 4 SIG. 3 |
|---|---|---|---|---|
| NORTH | +0.500 | +0.500 | −0.500 | −0.500 |
| EAST | +0.500 | +0.500 | +0.500 | +0.500 |
| SOUTH | +0.500 | −0.500 | −0.500 | +0.500 |
| WEST | +0.500 | −0.500 | +0.500 | −0.500 |

Figure 2:
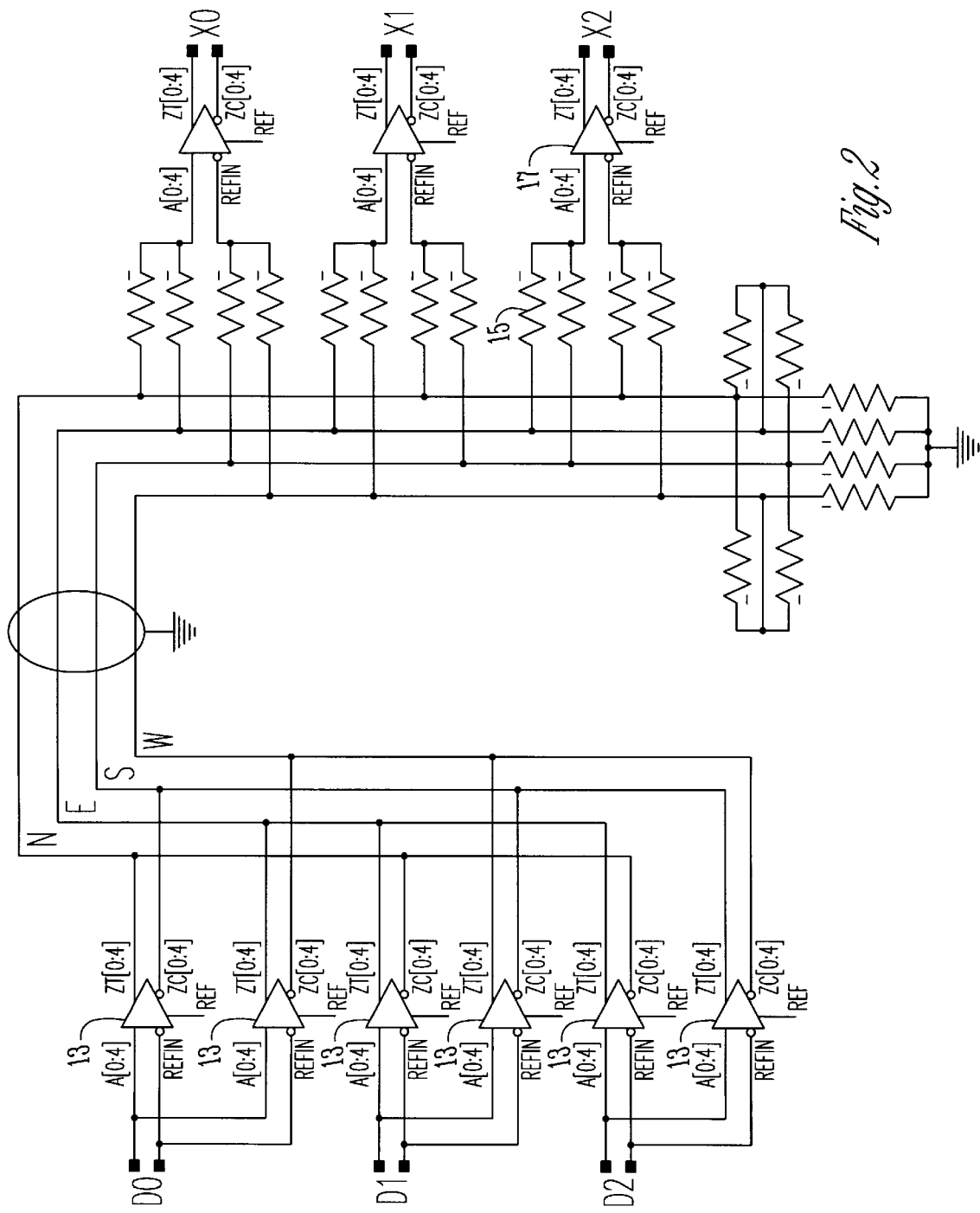
FIG. 2 is a schematic drawing of a data channel which can be used to transmit three data signals across a transmission line that has four non-grounded conductors.

A circuit embodying such an eigen-mode encoding matrix can be implemented with six differential comparators 13 as is shown in FIG. 2. A corresponding decoder can be formed using twelve resistors 15 connected to three comparators 17.

This same concept may be extrapolated to larger numbers of signals and wires in order to minimize the "overhead" associated with the extra wire needed to accommodate the fact that we chose not to use the common mode. There are no absolute limits to the number of signals that may be encoded across a group of wires, but the optimum number will be primarily influenced by the limitations of the encoder and decoder circuit designs. Once the overhead associated with the "extra" wire becomes relatively small, the incremental benefits accrued by increasing the group size becomes limited. Therefore, there is not a strong incentive to use large signal groups with this encoding technique.

It should be noted that although one eigen-mode encoding matrix is shown in Table 1, there may be many possible encoding matrices that satisfy the requirements for eigen-mode encoding. The optimum matrix depends on issues such as the desire for symmetry. These issues must be weighed carefully during the design of the eigen-mode encoding and decoding devices.

Figure 4:
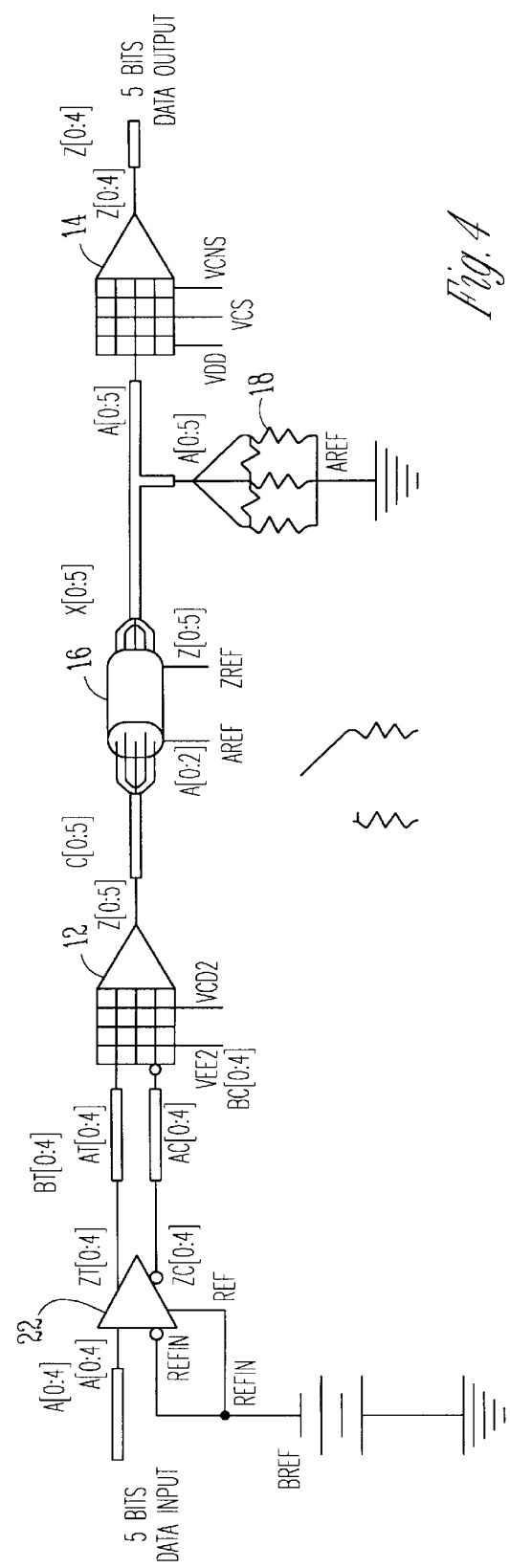
FIG. 4 is a schematic drawing of a data channel which can be used to transmit five data signals across a transmission line that has six non-grounded conductors.

A five signal embodiment is described next. One such embodiment is shown in FIG. 4. FIG. 4 is a high level diagram of a communications system 10 having five signals [0:4]. System 10 includes an encoder/driver 12, a transmission line 16, a termination network 18, a receiver/decoder 14, and a buffer 22.

Figure 5:
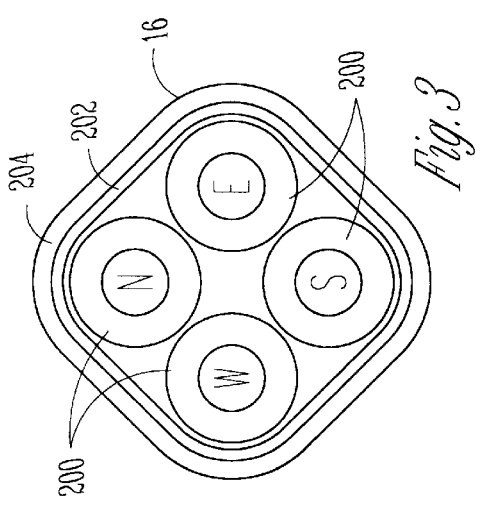
FIG. 5 is a drawing of the cross section of a multi-conductor transmission line, for which the number of wires is seven, the number of un-grounded conductors is six, and the number of signals that can be transmitted, using eigen-mode encoding, is five.

In one embodiment, transmission line 16 is a seven wire transmission line as is shown in FIG. 5. A bundle of seven insulated wires, bundled and wrapped with a grounded shield, makes an ideal medium for conducting eigen-mode encoded signals. This number of wires fit tightly together in a way that prevents shifting, and subsequent disruption of electrical characteristics. The stability of this bundle is similar to the construction of a rope, but without the twist, since the metalized ground shield will hold the bundle together. A four wire "quadax" does not have this natural tendency for the wires to stay in the correct orientation, and the resulting shifting can result in cross-talk between signals. In this example, the central wire in the bundle may be grounded in order to maintain symmetry in the characteristic of the remaining wires, and thereby facilitating efficient encoding and decoding circuitry. This will also insure that both current balancing, and common mode rejection will be realized. It is also possible to connect the center conductor to a power supply (with appropriate current limiting) in order to power peripheral circuits. A representative seven wire shielded transmission line includes seven silver plated copper wires (labeled 1–6 and ground). Each wire is insulated using FEP insulation 200. An aluminum/polyester shield 202 surrounds the wires. A PVC jacket 204 covers shield 202.

The wires in an eigen-mode encoded cable can be the same types of wires used in coax, twinax, or quadax cables. Two aspects of attenuation should be considered: the attenuation at the highest frequencies that the wire must conduct and the difference in attenuation at high frequencies versus low frequencies. The latter issue is of greater concern because it can cause signal distortion, and increased probability of corruption of transmitted data.

If a signal is to be transmitted a short distance, and/or if the frequency is not too high, then it is probable that a wire gauge can be chosen that will have low enough attenuation that signal integrity will be acceptable. Silver plated copper wires would be preferred in this case. As distances get greater, and frequencies get higher, then there is an incentive to include an equalization technique to compensate for the attenuation, rather than paying for thicker cables. Eigen-mode encoding can be used in conjunction with equalization and encoding techniques, including (but not limited to):

1) equalization circuits using networks of resistors and capacitors; 2) equalization circuits using finite impulse response filters (FIR); 3) equalization using the intrinsic properties of wires that have a low (or no) conductivity core, with a high conductivity coating; and 4) time domain DC balancing techniques such as 4b/5b encoding and 8b/10b encoding, and partial response maximum likelihood (PRML) encoding.

In one embodiment, the dielectric through which the conductors travel has a uniform dielectric constant. This will insure that each mode of propagation, and therefore each signal, travels at the same velocity. If the signals do not travel at the same velocity, then it will be more complicated generating the timing necessary to latch the data bits at the correct time at the receiver. If, however, eigen-mode encoded signals must travel through an environment with non-uniform dielectrics, they will still have an advantage over other transmission techniques because the signals will not suffer the dispersion caused by parts of signals propagating at different speeds on different modes, and will not suffer from the crosstalk associated with non-uniform dielectrics.

In one such embodiment, the dielectric constant of the insulation on the wires is kept low in order to minimize attenuation, cable cross section, and propagation delay. Some of the commonly practiced methods for achieving lower dielectric constant is to include air pockets in the dielectric. Some of the ways to achieve this are to make a fibrous dielectric (expanded PTFE), a foamy dielectric (foamed polyolefin), or to build some sort of supports to suspend the wire in a tube of air. The latter construction technique seems to yield the lowest variation in velocity of different modes.

It should be noted that the shield is not absolutely necessary since with eigen-mode encoding there will be no current transients flowing through ground. It is, however, highly recommended in order that all the modes of propagation have similar velocities, similar impedances, and also to minimize RF emissions. In some applications, it may be acceptable to shield the bundle of wires, but to leave the shield ungrounded at the ends of the cable. This would maintain the electrical propagation characteristics of the bundle, and leave the emissions and EMI susceptibility issues to be addressed with other components, such as a grounded braided shield around a bundle of wire bundles.

In one embodiment, the material used for the shield is the same laminate currently used to shield coax and twinax (2 wire) differential transmission lines. This is often a polyester film laminated with a thin aluminum foil. It should be noted that slightly lower attenuation can be achieved by using a foil with higher conductivity, such as copper.

Once transmission line 16 has been designed, then its electrical characteristics must be calculated. The most efficient way to do this is to use any commercially available field solver program. Some field solver programs, such as Maxwell by Ansoft, will also perform modal analysis. It will calculate modal impedances, modal velocities, and the set of orthogonal eigen vectors that transform between the voltages on the wires, and the voltages associated with each eigen-mode. Tables 2 through 4 show the results from the analysis of a shielded bundle of 7 wires that has the center conductor grounded.

TABLE 2

INDUCTANCE MATRIX = L

| (H/m) | LINE 1 | LINE 2 | LINE 3 | LINE 4 | LINE 5 | LINE 6 |
|---|---|---|---|---|---|---|
| LINE 1 | 2.42E-7 | 2.44E-8 | 3.70E-9 | 1.20E-9 | 3.7E-9 | 2.44E-8 |
| LINE 2 | 2.44E-8 | 2.42E-7 | 2.44E-8 | 3.70E-9 | 1.20E-9 | 3.7E-9 |
| LINE 3 | 3.7E-9 | 2.44E-8 | 2.42E-7 | 2.44E-8 | 3.70E-9 | 1.20E-9 |
| LINE 4 | 1.20E-9 | 3.7E-9 | 2.44E-8 | 2.42E-7 | 2.44E-8 | 3.70E-9 |
| LINE 5 | 3.70E-9 | 1.20E-9 | 3.7E-9 | 2.44E-8 | 2.42E-7 | 2.44E-8 |
| LINE 6 | 2.44E-8 | 3.70E-9 | 1.20E-9 | 3.7E-9 | 2.44E-8 | 2.42E-7 |

TABLE 3

ELECTROSTATIC INDUCTION MATRIX = B

| (F/m) | LINE 1 | LINE 2 | LINE 3 | LINE 4 | LINE 5 | LINE 6 |
|---|---|---|---|---|---|---|
| LINE 1 | 8.90E-11 | -9.58E-12 | -3.89E-13 | -7.95E-14 | -3.89E-13 | -9.58E-12 |
| LINE 2 | -9.58E-12 | 8.90E-11 | -9.58E-12 | -3.89E-13 | -7.95E-14 | -3.89E-13 |
| LINE 3 | -3.89E-13 | -9.58E-12 | 8.90E-11 | -9.58E-12 | -3.89E-13 | -7.95E-14 |
| LINE 4 | -7.95E-14 | -3.89E-13 | -9.58E-12 | 8.90E-11 | -9.58E-12 | -3.89E-13 |
| LINE 5 | -3.89E-13 | -7.95E-14 | -3.89E-13 | -9.58E-12 | 8.90E-11 | -9.58E-12 |
| LINE 6 | -9.58E-12 | -3.89E-13 | -7.95E-14 | -3.89E-13 | -9.58E-12 | 8.90E-11 |

TABLE 4

SIGNAL TO 6 LINE EIGEN-MODE ENCODING MATRIX = Sv

| | MODE 1 common | MODE 2 signal 1 | MODE 3 signal 2 | MODE 4 signal 3 | MODE 5 signal 4 | MODE 6 signal 5 |
|---|---|---|---|---|---|---|
| LINE 1 | +0.408 | +0.572 | -0.078 | +0.532 | -0.224 | +0.408 |
| LINE 2 | +0.408 | +0.353 | +0.456 | -0.072 | +0.573 | -0.408 |
| LINE 3 | +0.408 | -0.219 | +0.534 | -0.460 | -0.349 | +0.408 |
| LINE 4 | +0.408 | -0.572 | +0.078 | +0.532 | -0.224 | -0.408 |
| LINE 5 | +0.408 | -0.353 | -0.457 | -0.072 | +0.573 | +0.408 |
| LINE 6 | +0.408 | +0.218 | -0.534 | -0.460 | -0.349 | -0.408 |

Note that $L_{ij}=L_{i+1,j+1}$ and $B_{ij}=B_{i+1,j+1}$ for all values of i and j. By grounding the center wire, they become diagonal matrices. The original L and B matrixes did not have the center conductor grounded and therefore did not have the preferred symmetry. Symmetry is important in order to make it easier to design an effective encoder, decoder, and termination network, and to insure current balance, and common mode rejection.

In table 4, the set of orthogonal eigen vectors have been arranged into a matrix that will be used to encode 5 signals onto the 6 lines in the cable. The encoding operation can be represented by a matrix multiplication of the input signal vector D by the encoding matrix Sv (shown in Table 4). Vector D contains the data to be transmitted in its last five elements, and a zero value in the first position since the first column in the encoding matrix is associated with the "common mode". The first column (mode 1) is clearly associated with the common mode since it is the only column that does not sum to zero.

This encoding matrix has several important properties:
1. The inverse of this matrix (the decoder) equals the transpose of this same matrix: $Sv^{-1}=Sv^T$.
2. The sum of the squares of each column equals 1.0 (each column is a unit vector).
3. The sum of the squares of each row equals 1 (each row is a unit vector).
4. Except for the "common mode", each element is either the negative of another element in its column, or the negative of the sum of two other elements in its column.

General Form of Encoding Matrix

It is not necessary in all cases to arrive at an exact matrix derived from a modal analysis of the transmission line. In some cases a general encoding matrix can be used for the encoding process and that general form can be modified to optimize design of the encoding/decoding system. An encoding matrix derived from a general formula might be preferred, for instance, when the design of the encoder and decoder can be simplified by the use of a smaller number of coefficient values or when the differences between transmission lines are small enough to ignore or their effect on eigen-mode encoding is negligible.

For example, an integrated circuit manufacturer may develop encoding and decoding matrices which are a function of only the number of signals in a group. In some such cases the manufacturer will have to specify acceptable choices in transmission line parameters such that the transmission will not, in fact, substantially harm the signal integrity characteristics associated with eigen-mode encoding.

Given inductance and capacitance matrices that have close to the preferred symmetry, one can write a general form of one appropriate encoding matrix as:

$$Sv_{ij}=(2/M)^{1/2} \cos((i-1)(j-1)w+pi/4), i=1,\ldots,M, j=1,\ldots,M$$

where i is the mode number (column), j is the wire number (row), w=2*pi/M, and where M is the number of un-grounded wires in the transmission bus. Such an equation will generate a matrix which is both symmetric and orthogonal. Therefore, the decoding matrix will be identical to the encoding matrix.

Other general forms can be developed; a balance should be struck between the complexity of the matrices and the effect of that complexity on signal integrity.

Termination

Figure 6:
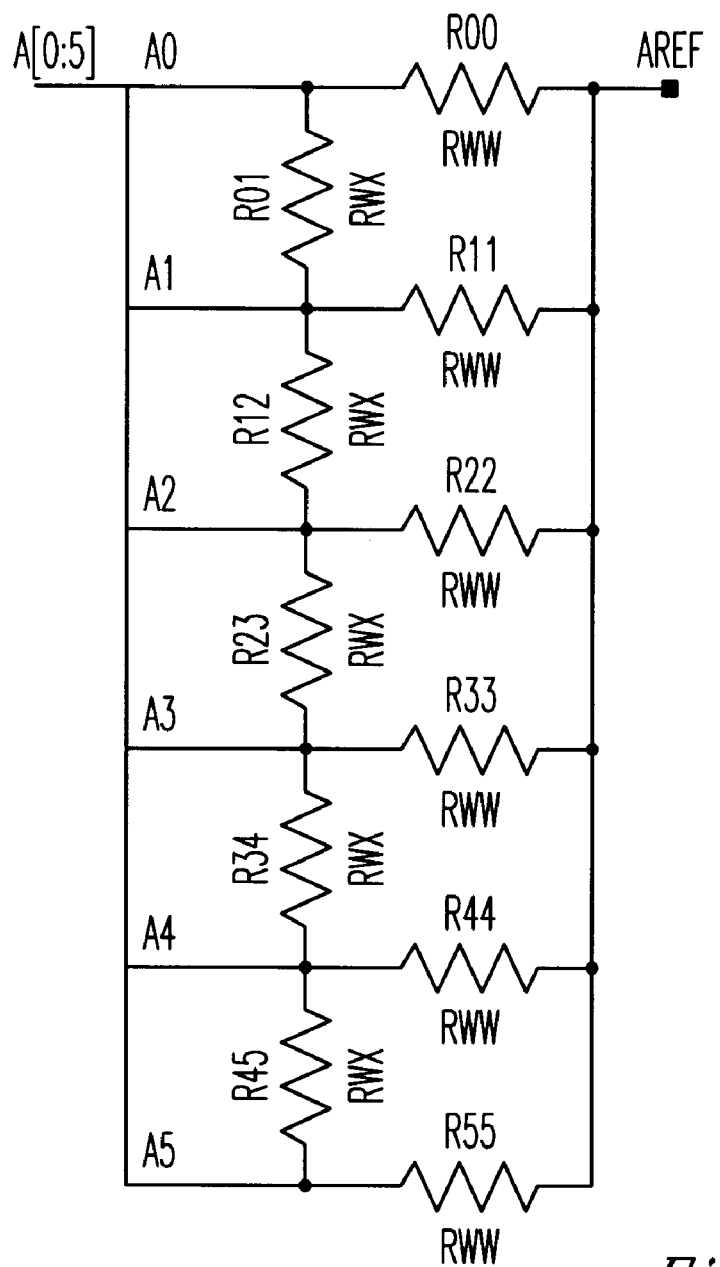
FIG. 6 is a schematic of a network of resistors that achieve an impedance match with the transmission line in FIG. 5.

A termination network 18 is shown in FIG. 4. In order to properly terminate this transmission line, an array of resistors R must be designed that matches the characteristic impedance of the cable. In general, a perfect termination network would require a number of resistors that is equal to $M^2+M/2$, where M is the number of non-grounded lines in the group. Because the L and C matrixes indicate insignificant coupling between nonadjacent line (a typical situation), in one embodiment only 2*M resistors are needed in the termination network. To calculate the appropriate resistor values, we can take advantage of the fact that all the modes propagate at close to the same speed for a well-designed cable. Therefore, the equation Rij=t/Cij can be used, where Rij describes the ideal termination network, t is the average propagation delay of all the eigen-modes, and C is the matrix that describes the network of capacitances in the transmission line. Cii is the sum of all the elements in column i in matrix B, and Cij=−Bij for the off-diagonal elements. Therefore, one should place a resistor of value Rii between line i and ground (or reference node) and place resistors of value Rij between line i and line j for all values of i and j. FIG. 6 shows a schematic of one termination network which could be used in the above example.

If a decoder circuit presents a resistive load on the end of the transmission line, as it would if it was embodied with a resistor summing network as described herein, then the values of the termination network resistors should be adjusted to higher values. The values should be chosen so that the combination of the termination network, in parallel with the decoder, form an impedance that matches the characteristics of the transmission line.

There are several commonly practiced techniques, for termination transmission lines, that will work with eigen-mode encoding. In addition to working with end-parallel termination, as described herein, source-parallel, source-series, and combinations of these techniques will also work. The preferred technique will depend on signal integrity issues associated with a particular application.

Encoder and Driver

Figure 7:
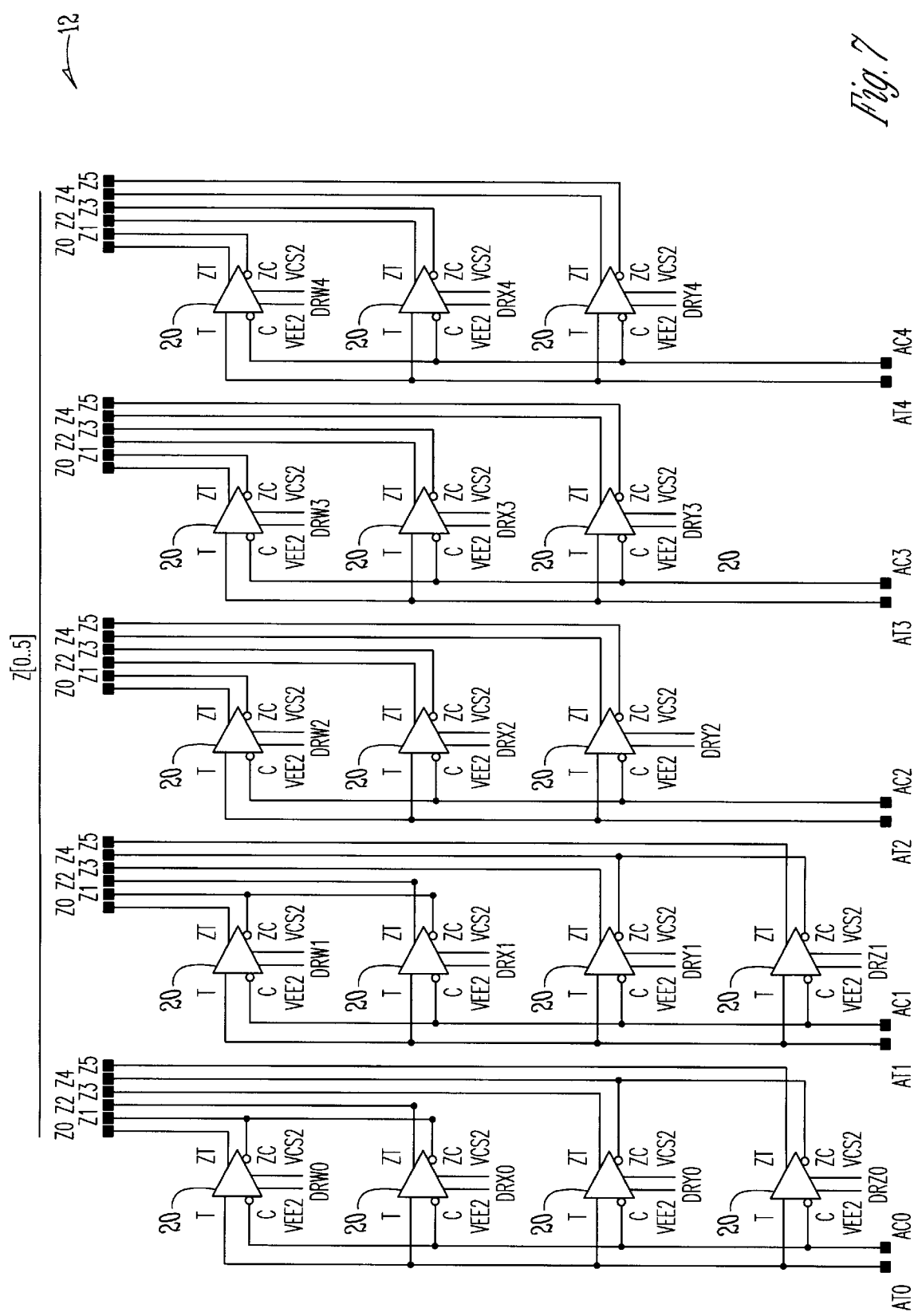
FIG. 7 is a schematic of a five signal to six conductor eigen-mode encoder and transmission line driver.

A simple combination encoder/driver circuit can be implemented using modified current mode logic (CML) circuits. One such encoder/driver 12 is shown in FIG. 7. With CML, a current is switched between the true and compliment side of a differential pair of conductors. The current creates a voltage across the termination resistors that are either at the driver, the receiver, or at both ends of the transmission line. Eigen-mode encoder/driver 12 will also use current sources, but it will require an array of 17 current sources 20, in this example, in order to implement the encoder/driver 12. The number of current sources 20 required will tend to approach (M*(M−1))/2, where M is the number of non-grounded lines in the transmission line. This relationship provides one of the reasons to avoid making M too large.

In order to calculate the appropriate currents in each of the generators, the voltage encoding matrix Sv must be transformed into a current encoding matrix Si using the equation $Si=R^{-1}Sv$.

Figure 8:
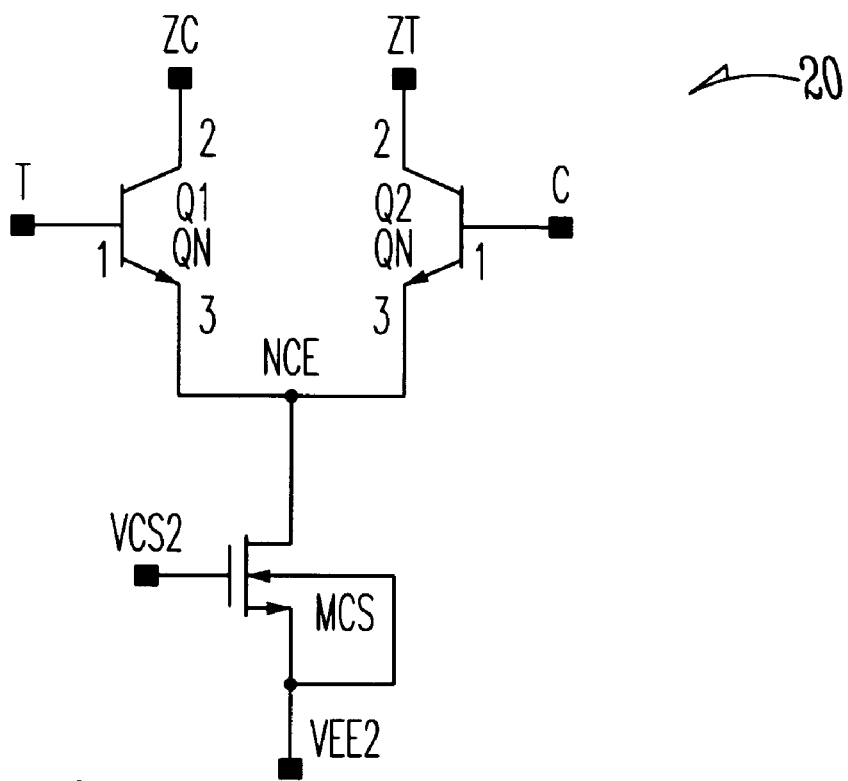
FIG. 8 is a schematic of a BiCMOS implementation of a current switch used in the eigen-mode decoder and driver.
Figure 9:
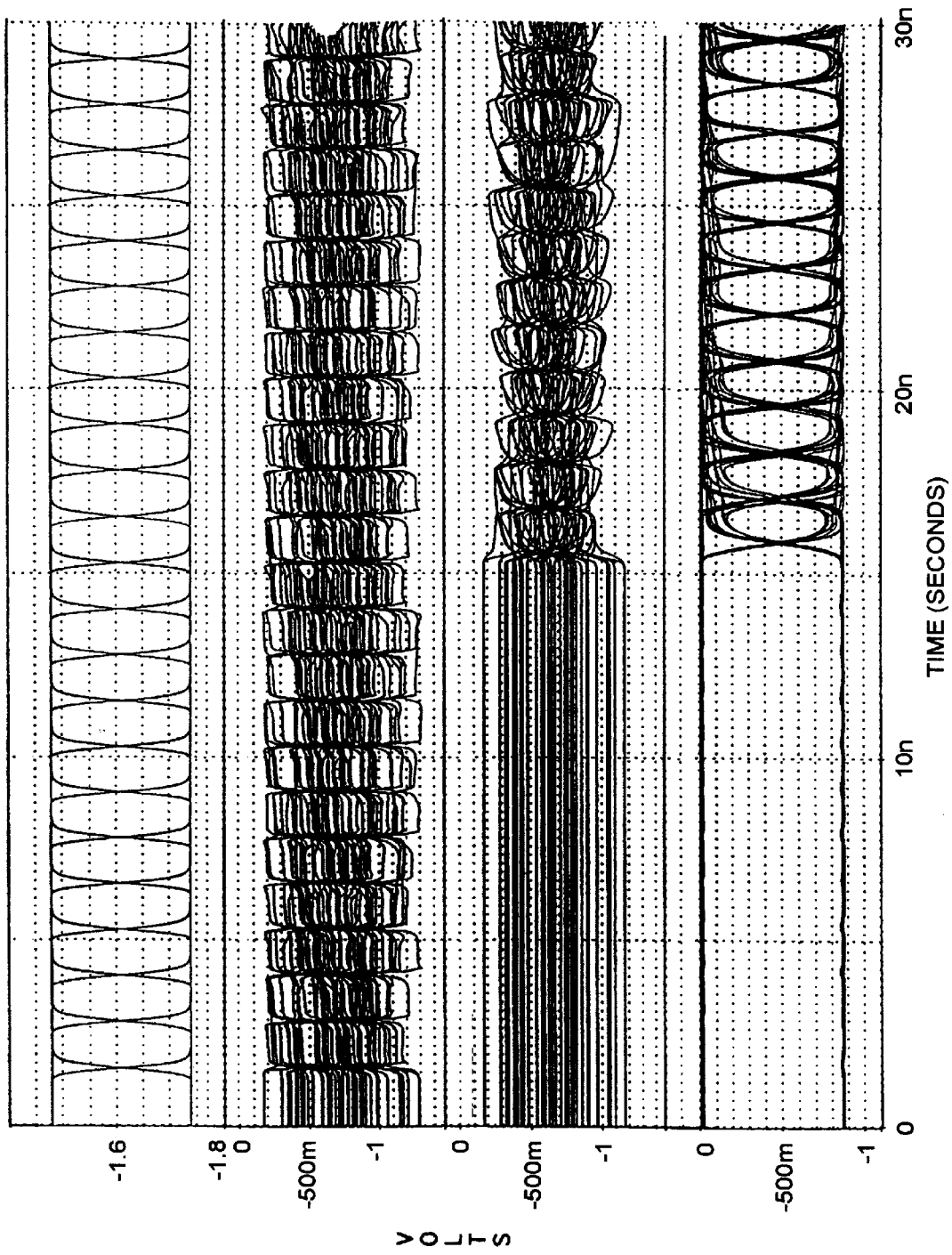
FIG. 9 is a plot of the voltages on nodes from a simulation of the circuit described in FIG. 4.

One embodiment of a current source 20 which can be used in the array of current sources in FIG. 7 is shown in FIG. 8. FIG. 8 shows a simple BiCMOS implementation of a differential switched current source 20. Note that this circuit is implemented using binary switches. There is no need for analog design techniques, and no need to tolerate the slow speeds and noise sensitivity commonly associated with analog techniques. FIG. 9 shows the encoded output of this circuit on nodes v(c0) to v(c5). In the example shown in FIG. 9, the first set of waveforms illustrate unencoded signals at the input to the decoder/driver. The second set illustrate encoded signals at the output of a BiCMOS encoder driver. The third set of waveforms illustrate encoded signals at the end of 0.3 meters of PCB and 2.5 meters of cable. Finally, the last waveform illustrates the decoded signals at the output of a BiCMOS decoder/receiver. Note that the voltage levels on each line can assume many different levels ($2^N$). This may look similar to the signals associated with multi-level logic, but the noise sensitivity of multi-level logic is dramatically worse than conventional communication techniques, while eigen-mode encoding is better.

Figure 10:
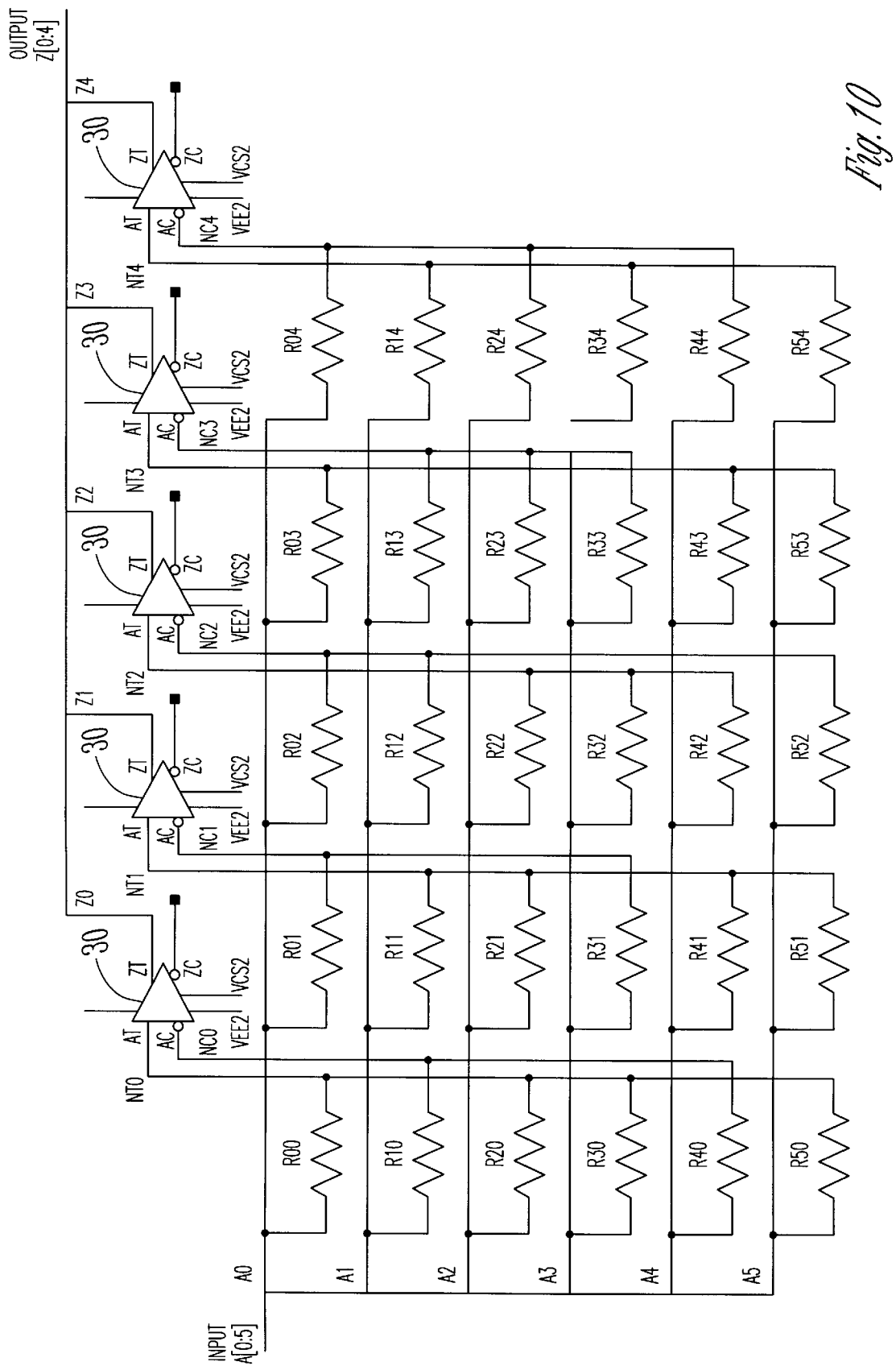
FIG. 10 is a schematic of a circuit that receives and decodes five signals from the voltages on 6 conductors.
Figure 11:
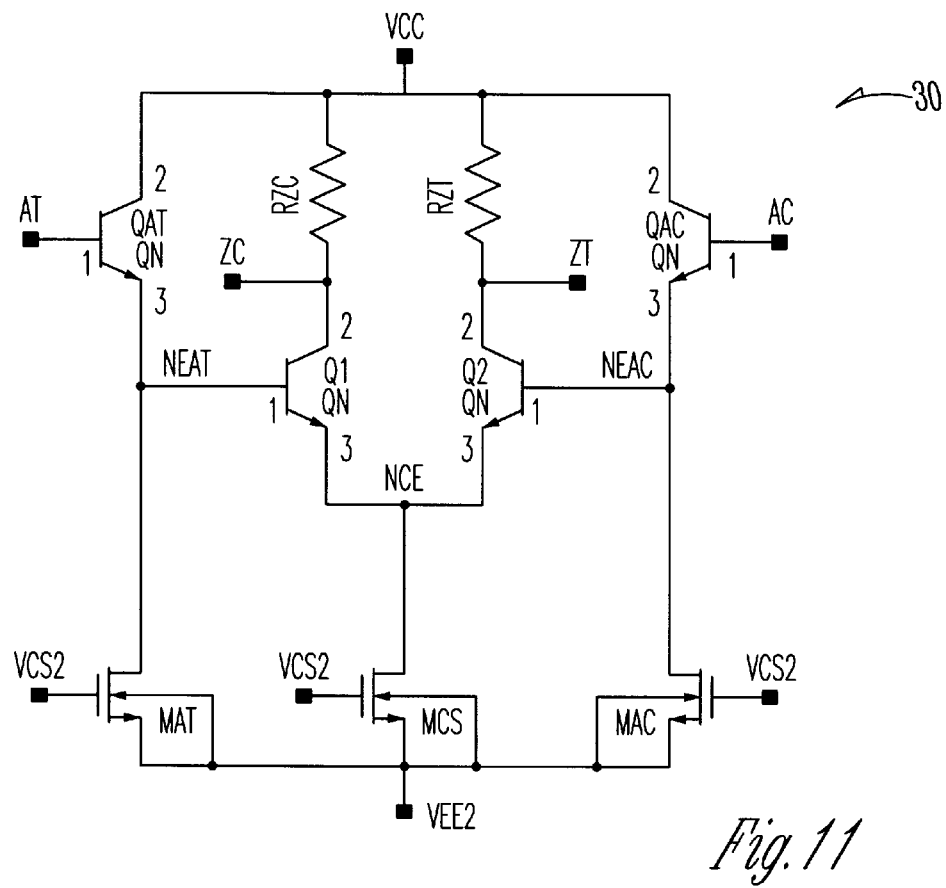
FIG. 11 is a schematic of a BiCMOS implementation of a comparator used in the receiver and decoder circuit.

The decoder we will use in this example is simply an array of M*(M−1) summing resistors, and M−1 differential comparators 30. The summing resistor matrix Rsum is derived from the decoding matrix $Sv^{-1}$ and a fixed resistance R0 which is based on circuit optimization. Let $Rsum_{ij}=|R0*1/(S^{-1}_{ij})|$. If the sign of $Sv^{-1}_{ij}$ is positive, then resistor $Rsum_{ij}$ is connected to the positive input of comparator 30, which will decide state of the ith bit, otherwise it is connected to the negative input. FIG. 10 shows a schematic of a decoding network 14 which can be used in communications system 10 of FIG. 1. FIG. 11 shows one embodiment of a BiCMOS differential comparator 30 which can be used in decoding network 14 of FIG. 10. In one embodiment of the comparator 30 shown in FIG. 11, RZC=RZT=600 ohms.

Figure 12:
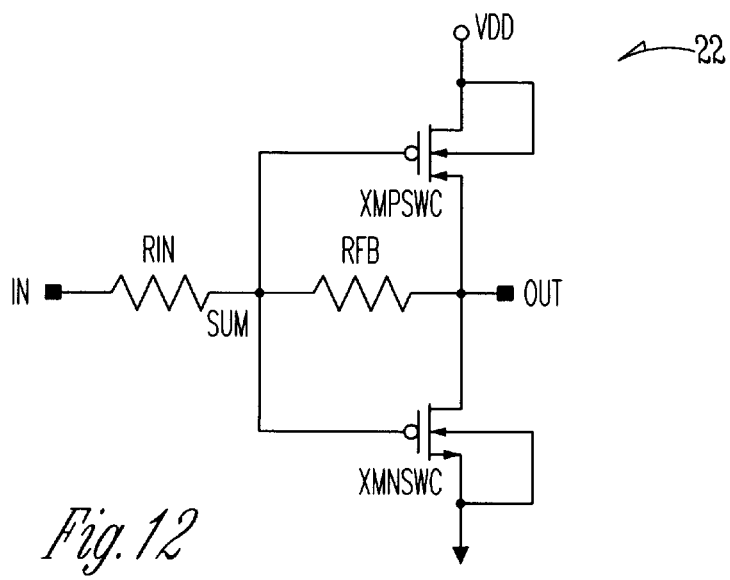
FIG. 12 is a schematic of a buffer that can be used to increase the efficiency of an eigen-mode transmitter by minimizing the average current drawn by the encoder and driver.
Figure 13:
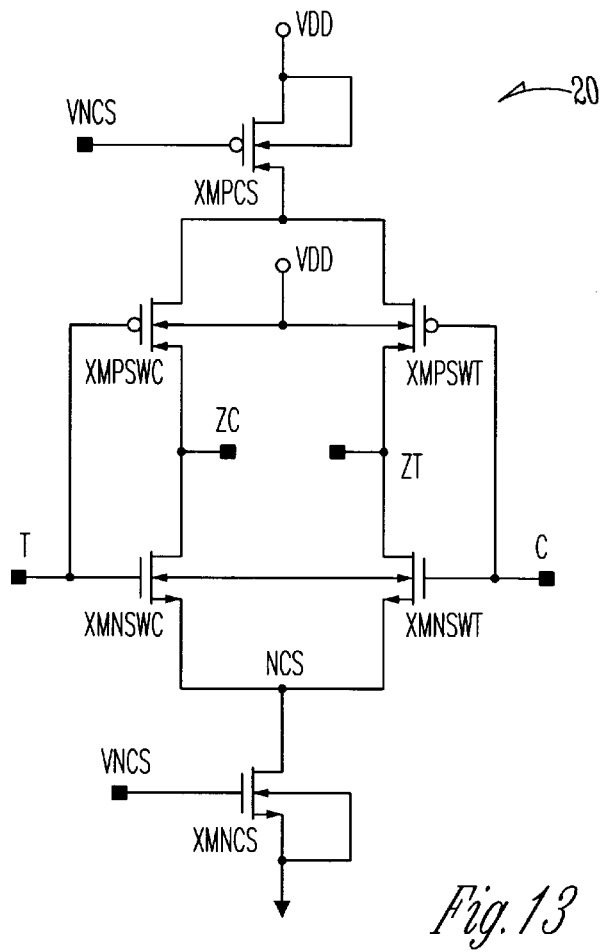
FIG. 13 is a schematic of a CMOS version of a current switch that can be used in the encoder and driver.
Figure 14:
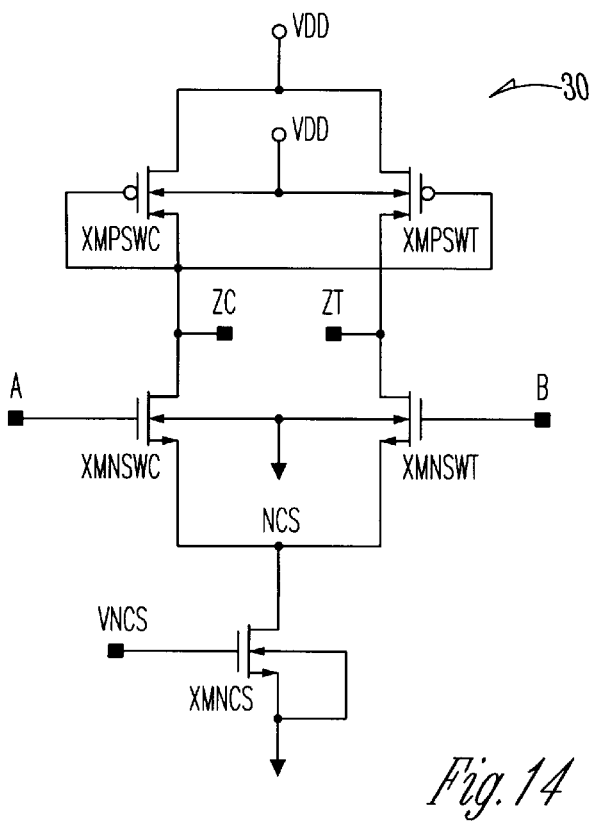
FIG. 14 is a schematic of a CMOS implementation of a comparator used in the receiver and decoder circuit.

A CMOS implementation can also be used in applications requiring reduced power consumption, reduced cost or compatability with other CMOS components. In one such embodiment, amplifier 22 of FIG. 4 is a low power CMOS linear amplifier such as is shown in FIG. 12. In one embodiment of the linear amplifier 22 shown in FIG. 12 RIN=300 ohms while RFB=600 ohmns. Likewise, a CMOS current driver and differential pair such as that shown in FIG. 13 can replace current sources 20 in FIG. 7. If there is not enough voltage available on the IC to power up this circuit, then either the lower portion (N-FETs) or the upper portion (P-FETs) can be used alone, with a slight degradation in performance. Finally, a CMOS differential comparator such as that shown in FIG. 14 can replace differential comparators 30 in FIG. 10.

Figure 15:
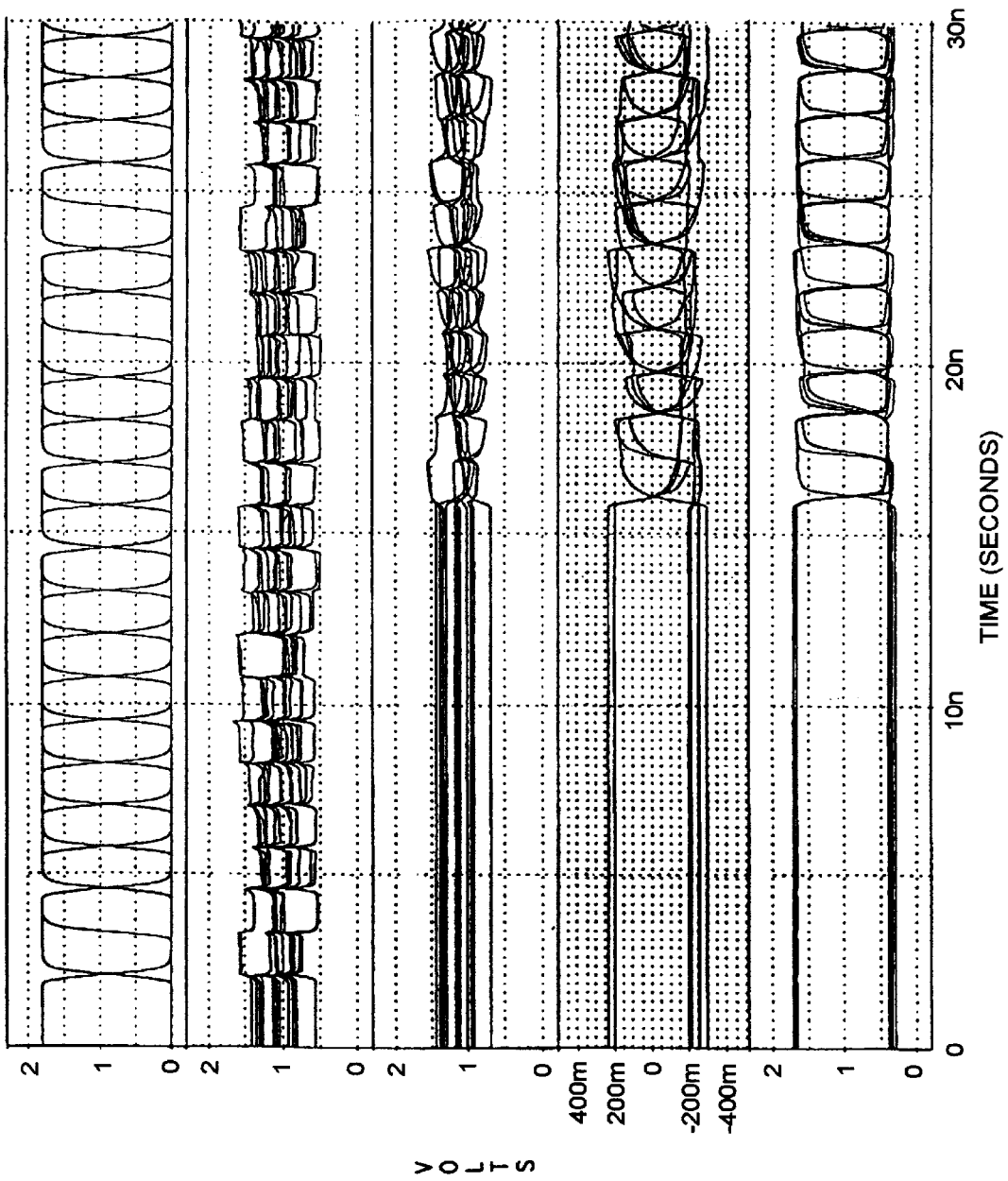
FIG. 15 is a plot of the voltages on nodes from a simulation of a CMOS version of the five signal eigen-mode communications channel.

FIG. 15 shows a simulation of a CMOS encoder/driver having the above CMOS components driving a 2.5 m cable. This simulation has the signal going through both a cable, and printed circuit boards. In the example shown in FIG. 15, the first set of waveforms illustrate unencoded signals at the input to the decoder/driver. The second set illustrate encoded signals at the output of a BiCMOS encoder driver. The third set of waveforms illustrate encoded signals at the end of 0.3 meters of PCB and 2.5 meters of cable, where the PCB length is divided between the driver and receiver. The fourth set of waveforms show signals after the decoder network but before the input buffer. The last waveform illustrates the decoded signals at the output of the input buffer.

Additional Features of Eigen-Mode Encoding

In addition to the features already mentioned, because eigen-mode encoding has intrinsic redundancy, it can be used to increase the reliability of an electronic system. Since each signal is spread across all the conductors in the encoding group, the failure of a particular conductor, or driver, will only cause limited degradation on any particular signal. This effect is analogous to what happens when part of a hologram is broken off. Since each pixel of the original image was encoded across all positions in the hologram, the loss of a small piece of the hologram will cause slight blurring of the image, but the image will be recognizable. The similarity to a hologram is reasonable considering the fact that a hologram is essentially a two dimensional spacial Fourier transform.

Eigen-Mode Encoding in Printed Circuit Boards

Figure 16:
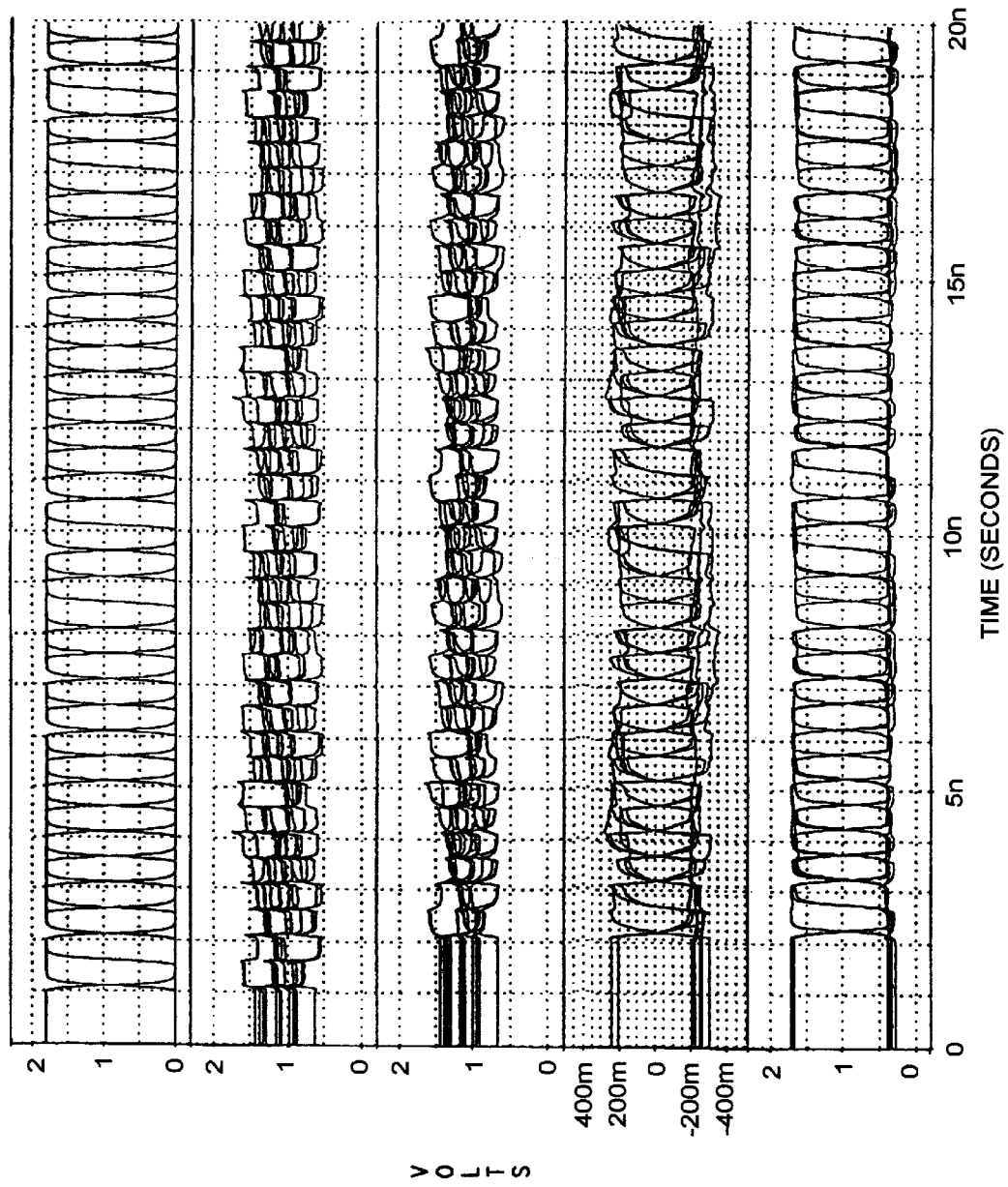
FIG. 16 is a plot of the voltages on nodes from a simulation of a CMOS version of the five signal eigen-mode communications channel.

Eigen-mode encoding can be used to advantage in all types of signal lines. In one embodiment, eigen-mode encoding is used to encode signals to be placed on signal buses within a printed circuit board (PCB). Not only is it acceptable to place traces close together in an encoded bus, but is desirable in order to match the impedance matrix of the PCB with the strong coupling in the impedance matrix of the cable. This will minimize reflections at the interface of the cable and the PCB. In particular, a PCB bus that closely matches the impedance matrix of the 7 wire cable shown in the example in FIG. 6 can be realized with 6 traces 0.08 mm wide, on 0.20 mm pitch, each 0.20 mm above a ground plane, in a PCB with a dielectric constant of 4.0. FIG. 16 shows a simulation of the CMOS encoder/driver driving a 0.15 m trace having the above characteristics. In the example shown in FIG. 16, the first set of waveforms illustrate unencoded signals at the input to the decoder/driver. The second set illustrate encoded signals at the output of a BiCMOS encoder driver. The third set of waveforms illustrate encoded signals at the end of 0.15 meters of PCB. The fourth set of waveforms show signals after the decoder network but before the input buffer. The last waveform illustrates the decoded signals at the output of the input buffer. These dimensions are very practical using current PCB technology. The density of eigen-mode encoded signals within a PCB can therefore be doubled compared to the density of differential signals given the same PCB technology. (Please note that, in contrast to the simulation shown in FIG. 15, the simulation shown in FIG. 16 has the signal going through only the printed circuit board.)

Full Duplex Operation

An additional advantage of eigen-mode encoding is that it can be used to establish a low-cost full duplex communications channel between two stations. One embodiment of such a channel 100 is shown generally in FIG. 17.

Figure 17:
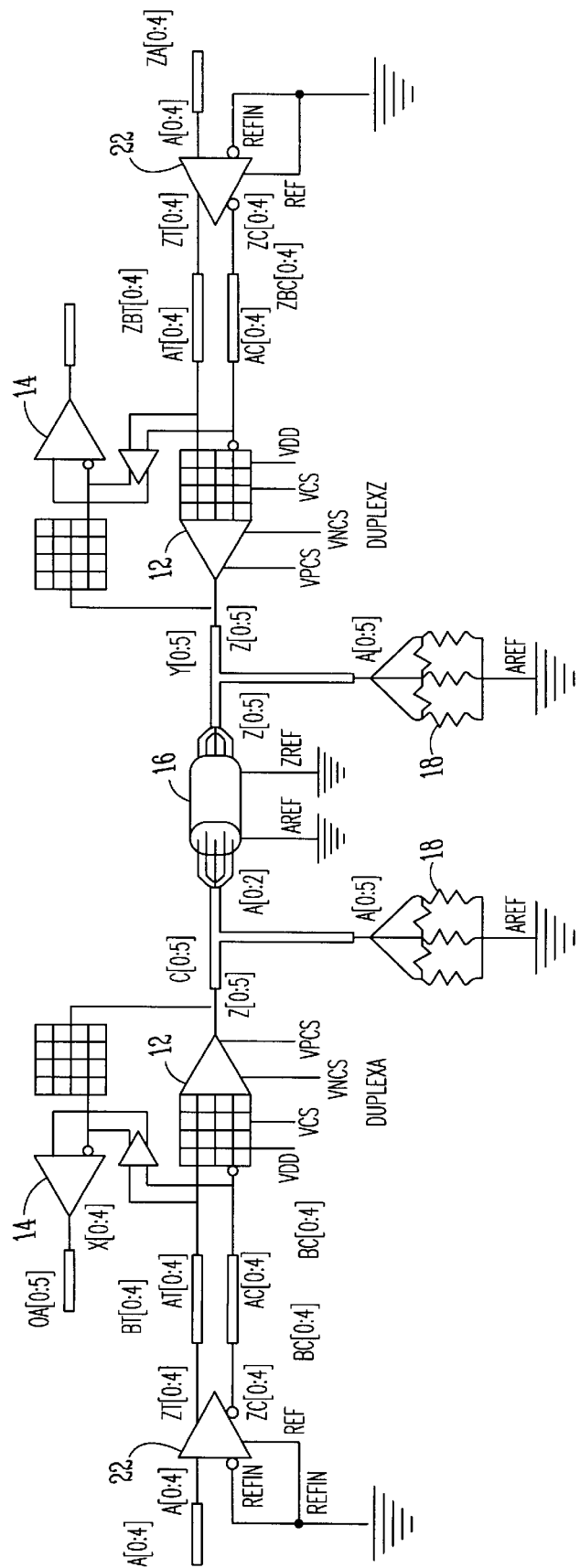
FIG. 17 is a schematic of a "full duplex" communications channel that uses eigen-mode encoding, and is capable of transmitting signals in both directions simultaneously.

This embodiment of a full duplex channel is able to extract the incoming data from the voltage on a port, which is found at the output of driver 12 in FIG. 17, which is a mixture of outgoing and incoming data. This can be accomplished by subtracting the outgoing pre-encoded data from the decoded voltage on the port, thereby leaving only a copy of decoded incoming data on the output of comparator 14. The embodiment described herein uses a current switch, such as the one detailed in FIG. 8, and symbolized by the small amplifier between decoder/driver 12, and comparator 14 in FIG. 17. The currents from this switch, in combination with the resistors in the decoder network, cancel the voltages that would otherwise occur in the decoder network due to outgoing data.

Figure 18:
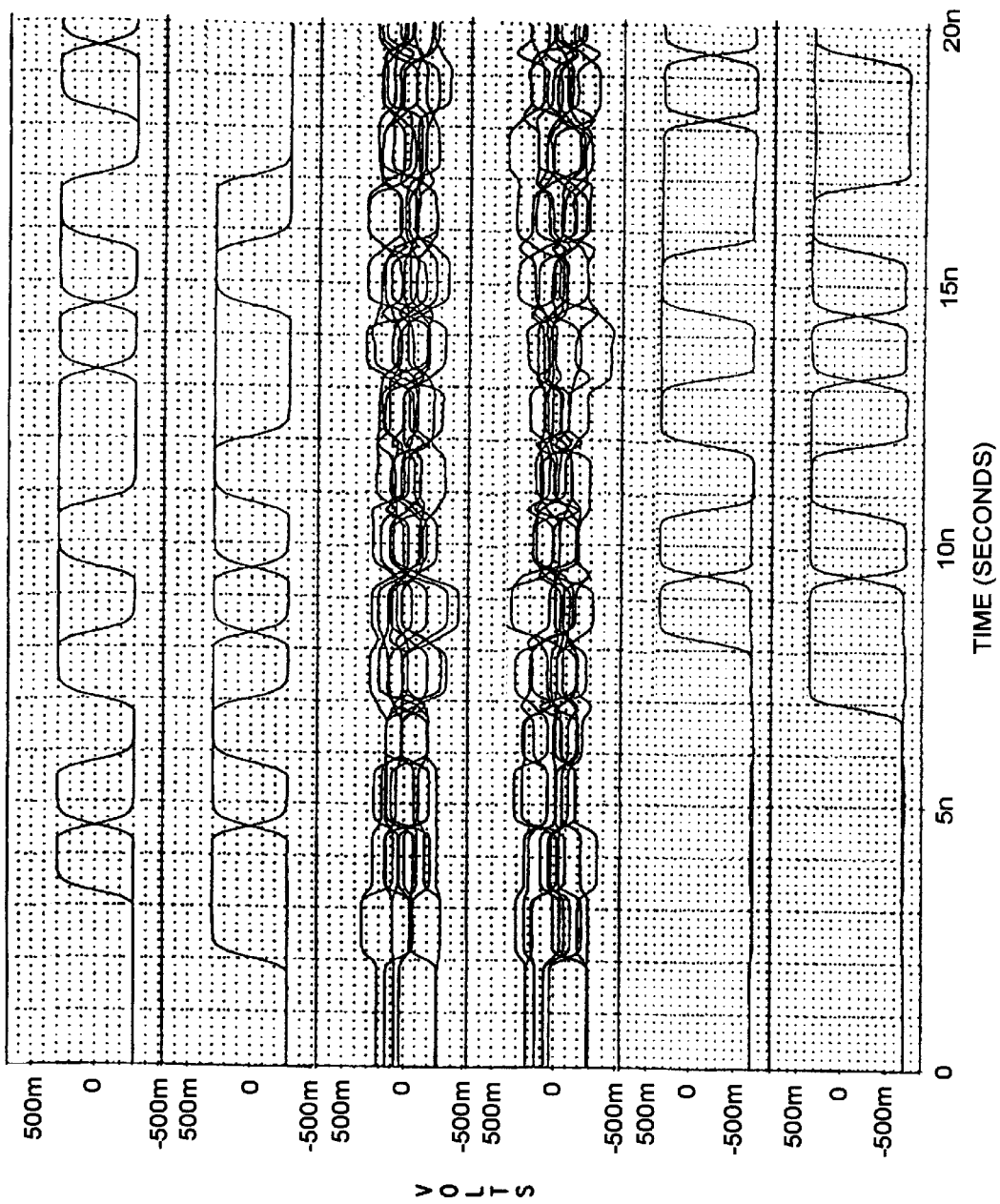
FIG. 18 is a plot of the voltages on nodes from a simulation of a full duplex eigen-mode communications channel.

FIG. 18 shows a simulation of channel 100. In the example shown if FIG. 18, the first and second sets of waveforms illustrate unencoded signals at the input to the decoder/driver at the "A" and "Z" ends, respectively. The third and fourth sets of waveforms illustrate encoded signals at the output of the respective BiCMOS encoder driver. The fifth and sixth sets of waveforms illustrate the decoded signals at the output of the input buffer on "Z" and "A", respectively.

Eigen-Mode Encoding in Memory Circuits

The size of memory circuits are continually being reduced in order to accommodate more bits of data on a given memory chip. One of the problems associated with this shrinking of memory circuits is the introduction of parasitic capacitance between adjacent memory cells, and between the bit lines linked to the memory cells. In one embodiment, eigen-mode encoding is used to compensate for the existence of these parasitic capacitances in a manner that is similar to the compensation for crosstalk that was demonstrated in the transmission line example above. Such an approach also provides the circuits with a high immunity to disturbances from alpha particles and cosmic rays, which are becoming a larger issue as the size and charge storage in memory cells decreases.

Eigen-Mode Encoding in Integrated Circuits

Integrated circuits also encounter signal integrity problems due to coupling between adjacent traces, and with ground bounce. These problems are similar to the problems encountered within PCBs, especially at high frequencies. Eigen-mode encoding can be used to mitigate these problems.

Other Eigen-Mode Encoding Applications

Eigen-mode encoding can be applied to a sequence of bits on a particular signal line, instead of to adjacent bits on a bus. Such an approach reduces the effects of inter-symbol interference. In particular, the distortion associated with frequency dependent losses will be minimized since there will be no low frequency components to the encoding signal. This is similar to what is achieved by 8b/10b encoding. Clock recovery, from transmitted data, is also easier since there is no chance of long periods of no activity on the encoded signals. In effect, eigen-mode encoding is used as a time domain transform, instead of a spacial transform.

In addition, since the coupling between adjacent bits of information on the surface of a magnetic recording media, or an optical recording media, is analogous to the coupling between wires in a transmission line, eigen-mode encoding helps mitigate the problems associated with this coupling. This may lead to denser packing of information onto these media.

It should be noted, however, a device which implements eigen-mode encoding on magnetic media must compensate for the fact that most digital magnetic recording media exhibit hysteresis, and other non-linear behaviors. Either signals must be conditioned, to compensate for the hysteresis and non-linearity, or magnetic materials must be chosen that have more linear properties. Analog audio tapes and analog video tapes have magnetic properties more appropriate for eigen-mode encoding than digital disk drive media.

Finally, because of the intrinsic noise immunity, optical communications channels can benefit from this encoding method. An additional advantage is that eigen-mode encoding compensates for drift in the characteristics of the drivers, laser diodes, or receivers.

In one optical channel embodiment, eigen-mode encoding is achieved by assigning signals to separate modes of propagation within each fiber. It should be noted that the number of modes of propagation that a fiber can support becomes larger as the diameter of a fiber becomes larger relative to the wavelength of the light within the fiber. One embodiment of a driver and an encoder, for such a system, therefore would modulate the amplitudes of different modes in a fiber by passing a laser beam through a material, such as gallium arsenide crystal, that rotates the polarization of the light when electric fields are applied to the crystal. Furthermore, if gallium arsenide is used as a polarization rotator, then high speed electronic circuits may be integrated onto the same crystal (or chip).

Conclusion

The trends in electronics, toward higher speeds and denser packaging, have increased the problems of signal degradation due to crosstalk, simultaneous switching outputs (SSO), ground bounce due to power transients, and electromagnetic interference (EMI). Traditionally, these problems have been minimized by the use of differential transmission lines, but at a cost that is sometimes difficult to justify. Conventional differential transmission systems use 2*n lines for n bits, where the system of the invention requires only n+1 lines. In addition, power consumed by the transmitter circuit is decreased because fewer signals have to be transmitted. The reduced number of required lines allows devices employing the system and methods of the invention to maintain high quality data transmission while reducing the costs associated with manufacturing and maintaining more transmission lines. Another advantage of the present invention is that common mode noise is removed at the receiver.

Finally, there has been a justifiable trend toward requiring that electronic systems be capable of operating in close proximity to each other, without disturbing each other's operation. Government agencies have been addressing this issue by setting upper limits on the amount of electromagnetic interference (EMI) a system creates, and by setting standards for the amount of electromagnetic interference that a system must tolerate, while still functioning properly (EMC standards). By eliminating transient ground currents due to signal switching, and by increasing the tolerance to common mode noise, eigen-mode encoding makes it easier for a system to satisfy both EMI and EMC standards.

It should be understood that the method of the present invention can be used in combination with a variety of operational modes, including but not limited to full duplex communications. By reducing noise generation at the transmitter and rejecting common mode noise at the receiver, the system of the present invention increases the data bandwidth on data buses.

Although the present invention has been described with reference to the preferred embodiments, those skilled in the art will recognize that changes may be made in form and detail without departing from the spirit and scope of the invention.

What is claimed is:

1. A method of encoding N signals for transmission over a transmission line having N+1 conductors, wherein N is an integer greater than one and wherein the N signals include signals in(0) through in(N−1), the method comprising the steps of:
   determining electrical characteristics of the transmission line, wherein the step of determining includes the steps of:
      calculating an inductance matrix (L) for the conductors in the transmission line;
      calculating an electrostatic induction matrix (B) for the conductors in the transmission line; and
      calculating an eigen-mode encoding matrix (Sv) as a function of the inductance (L) and electrostatic induction (B) matrices; and
   encoding the N signals into N+1 encoded signals comprising signals enc(0) through enc(N), wherein the step of encoding comprises the step of encoding in(N−1) as a function of the eigen-mode encoding matrix (Sv).

2. The method according to claim 1, wherein the step of encoding in(N−1) as a function of the eigen-mode encoding matrix includes the step of multiplying an input signal vector D by the eigen-mode encoding matrix (Sv).

3. A method of encoding N signals for transmission over a plurality of different transmission lines, wherein each transmission line has N+1 conductors, wherein N is an integer greater than one and wherein the N signals include signals in(0) through in(N−1), the method comprising the steps of:
   determining electrical characteristics of each of the plurality of transmission lines, wherein the step of determining includes the steps of:
      calculating an inductance matrix (L) for the conductors in each transmission line;
      calculating an electrostatic induction matrix (B) for the conductors in each transmission line;
      calculating a generalized eigen-mode encoding matrix (Sv) as a function of each of the plurality of inductance (L) and electrostatic induction (B) matrices; and
   encoding the N signals into N+1 encoded signals comprising signals enc(0) through enc(N), wherein the step of encoding comprises the step of encoding in(N−1) as a function of the eigen-mode encoding matrix (Sv).

4. The method according to claim 3, wherein the step of encoding in(N−1) as a function of the eigen-mode encoding matrix includes the step of multiplying an input signal vector D by the eigen-mode encoding matrix (Sv).

5. A method of decoding N+1 eigen-mode encoded signals, wherein N is an integer greater than one, wherein the N+1 signals include signals enc(0) through enc(N) and wherein the eigen-mode encoded signals are encoded as a function of an eigen-mode encoding matrix (Sv), the method comprising the steps of:
   determining an eigen-mode decoding matrix (Sv_inv) as a function of the eigen-mode encoding matrix (Sv);
   decoding the N+1 eigen-mode encoded signals enc(0) through enc(N) into N output signals comprising signals out(0) through out(N−1), wherein the step of decoding comprises the step of decoding enc(N) as a function of the eigen-mode decoding matrix (Sv_inv).

6. The method according to claim 5, wherein the step of decoding enc(N) as a function of the eigen-mode decoding matrix includes the step of multiplying a vector including enc(N) by the eigen-mode decoding matrix (Sv_inv).

7. A communications system, comprising:
   a transmission line having N+1 conductors, wherein N is an integer greater than one;
   an eigen-mode encoder/driver connected to the transmission line, wherein the eigen-mode encoder/driver encodes input signals as a function of an eigen-mode encoding matrix (Sv), wherein the eigen-mode encoding matrix (Sv) is a function of an inductance matrix (L) and an electrostatic induction matrix (B) calculated for the conductors in the transmission line; and
   an eigen-mode receiver connected to the transmission line, wherein the eigen-mode receiver decodes signals received from the transmission line as a function of the eigen-mode encoding matrix (Sv).

8. The communications system according to claim 7, wherein the eigen-mode receiver decodes signals received from the transmission line as a function of an inverse of the eigen-mode encoding matrix (Sv).

9. A full duplex communications system, comprising:
   a transmission line having N+1 conductors, wherein N is an integer greater than one;
   a first and a second eigen-mode encoder/driver, wherein each encoder/driver is connected to the transmission line and wherein each eigen-mode encoder/driver encodes input signals as a function of an eigen-mode encoding matrix (Sv), wherein the eigen-mode encoding matrix (Sv) is a function of an inductance matrix (L) and an electrostatic induction matrix (B) calculated for the conductors in the transmission line; and
   a first and a second eigen-mode receiver, wherein each eigen-mode receiver is connected to the transmission line and wherein each eigen-mode receiver decodes signals received from the transmission line as a function of the eigen-mode encoding matrix (Sv).

10. The full duplex communications system according to claim 9, wherein the eigen-mode receiver decodes signals received from the transmission line as a function of an inverse of the eigen-mode encoding matrix (Sv).

11. An eigen-mode encoder for driving an eigen-mode encoded signal over a transmission line having a plurality of conductors, the eigen-mode encoder comprising:

N input lines, wherein N is greater than one;

N+1 output lines; and an encoding circuit connected to the N input lines and the N+1 output lines, wherein the encoding circuit encodes signals received on the N input lines into N+1 eigen-mode encoded signals and drives the N+1 eigen-mode encode signals out onto the N+1 output lines, wherein the eigen-mode encoded signals are encoded as a function of an eigen-mode encoding matrix (Sv), wherein the eigen-mode encoding matrix (Sv) is a function of an inductance matrix (L) and an electrostatic induction matrix (B) calculated for conductors in the transmission line.

12. An eigen-mode decoder for receiving and decoding an eigen-mode encoded signal over a transmission line having a plurality of conductors, wherein the eigen-mode encoded signals are encoded as a function of an eigen-mode encoding matrix (Sv), the eigen-mode decoder comprising:

N+1 input lines, wherein N is greater than one;

N output lines; and a decoding circuit connected to the N+1 input lines and the N output lines, wherein the decoding circuit decodes signals received on the N+1 input lines into N output signals and drives the N output signals out onto the N output lines, wherein the input signals are decoded as a function of the eigen-mode encoding matrix (Sv).

13. The full duplex communications system according to claim 12, wherein the eigen-mode receiver decodes signals received from the transmission line as a function of an inverse of the eigen-mode encoding matrix (Sv).

* * * * *